United States Patent
Dick et al.

(10) Patent No.: US 6,631,006 B2
(45) Date of Patent: Oct. 7, 2003

(54) SYSTEM AND METHOD OF MARKING MATERIALS FOR AUTOMATED PROCESSING

(75) Inventors: Spencer B. Dick, Portland, OR (US); Douglas J. Malone, Battleground, WA (US); Jan Lankamp, Jr., Wierden (NL); David Lee, Vancouver, WA (US); David A. Morgan, Portland, OR (US)

(73) Assignee: Precision Automation, Inc., Vancouver, WA (US)

( * ) Notice: Subject to any disclaimer, the term of this patent is extended or adjusted under 35 U.S.C. 154(b) by 0 days.

(21) Appl. No.: 09/861,231

(22) Filed: May 17, 2001

(65) Prior Publication Data

US 2002/0171849 A1 Nov. 21, 2002

(51) Int. Cl.[7] .............................................. G01B 11/14
(52) U.S. Cl. ..................................... 356/625; 356/237.2
(58) Field of Search ................................ 356/614, 622, 356/624–625, 243.1, 243.8, 237.1, 237.2

(56) References Cited

U.S. PATENT DOCUMENTS

| | | | |
|---|---|---|---|
| 3,886,372 A | 5/1975 | Sanglert | 250/571 |
| 4,144,449 A | 3/1979 | Funk et al. | 250/221 |
| 4,286,880 A * | 9/1981 | Young | 356/431 |
| 4,541,722 A | 9/1985 | Jenks | 356/376 |
| 4,596,172 A | 6/1986 | Visser | 83/71 |
| 4,682,894 A * | 7/1987 | Schmidt et al. | 356/375 |
| 4,939,379 A * | 7/1990 | Horn | 250/560 |
| 5,042,341 A | 8/1991 | Greten et al. | 83/755 |
| 5,142,158 A | 8/1992 | Craig, Jr. | 250/560 |
| 5,201,258 A | 4/1993 | Cremona | 83/75.5 |
| 5,254,859 A | 10/1993 | Carman et al. | 250/560 |
| 5,444,635 A | 8/1995 | Blaine et al. | 364/474.13 |
| 5,960,104 A | 9/1999 | Conners et al. | 382/141 |

* cited by examiner

Primary Examiner—Jordan M. Schwartz
(74) Attorney, Agent, or Firm—Kolisch Hartwell, P.C.

(57) ABSTRACT

A marking assembly for marking feature locations of a material and an automated processing system that uses input from the marking assembly to process the material. Feature locations such as defect positions and the size of the material are measured with an optical measuring device. The optical measuring device sends and receives light along a light path that is substantially parallel to a processing dimension of the material. A user manually interrupts the light path at a feature location, sending light from the feature location to the optical measuring device. The optical measuring device measures the feature location from the light received from the feature location and sends the feature location to a processor. The processor automatically positions the material relative to a modifying device, based on the feature location.

17 Claims, 2 Drawing Sheets

SYSTEM AND METHOD OF MARKING MATERIALS FOR AUTOMATED PROCESSING

FIELD OF THE INVENTION

The invention involves a system for marking a material. In particular, the invention relates to an optical system for virtually marking features of a material along a processing dimension to facilitate automated processing of the material by a modifying device, such as a saw.

BACKGROUND OF THE INVENTION

Automated saws are used extensively to cut materials for many different manufacturing applications. For example, saws may use a microprocessor to determine how to cut according to a user-supplied list of required dimensions i.e. a cut list. The microprocessor controls movement of a fence to locate for cutting in a manner that optimizes utilization of raw material. For some applications, the operator may need to mark defects, such as knots, cracks, or discolored portions of a material before cutting. The marked locations of defects allow the microprocessor to select cutting sites that exclude defects while making optimal use of the material according to the cut list requirements. Marking defects by measuring their location and inputting the locations along with the overall length of the material through the keyboard is time consuming and prone to operator error.

An improvement to this marking approach is described in U.S. Pat. No. 4,596,172 to Visser. In Visser, a user marks a wood product along its length with a marking instrument, such as a fluorescent crayon. The resulting mark is optically detected by a scanner unit mounted above the wood product. The scanner unit digitizes the position of each mark along the length of the wood product as it is conveyed past the scanner unit and sends this information to the microprocessor. This method of marking wood products is expensive to implement, and generally requires that the scanner unit be positioned far from the cutting site as the wood product is moved along a conveyer. The method may also result in unwanted marks on finished material.

Alternatively, a movable scanner unit may be used that tracks along the length of a stationary wood product. However, this movable scanner may require a movement mechanism that may be expensive and prone to mechanical difficulties. In addition, the period of time required for the scanner to move over the entire length of the wood product may be a rate-limiting step for inputting the defect locations of a wood product. Therefore, a simple and inexpensive assembly for use with an automated material processing system is still required to allow a user to quickly and accurately communicate the length and feature locations on a piece of material to an automated processing system.

SUMMARY OF THE INVENTION

The present invention provides an assembly for marking one or more feature locations along a processing dimension of a material. The assembly may use a light source that sends light along an optical path, and a light detector that receives light from the source. The device is configured to measure a feature location at a point along the optical path where light is reflected to the detector. A marking station orients the material so that the optical path is substantially parallel to the processing dimension of the material. Manual interruption of the optical path at a feature location communicates the feature location to a processor. The processor may be used to control a positioning assembly that moves the material relative to a modifying device such as a saw, based on the feature location and user-supplied processing requirements.

DETAILED DESCRIPTION

Figure 1:
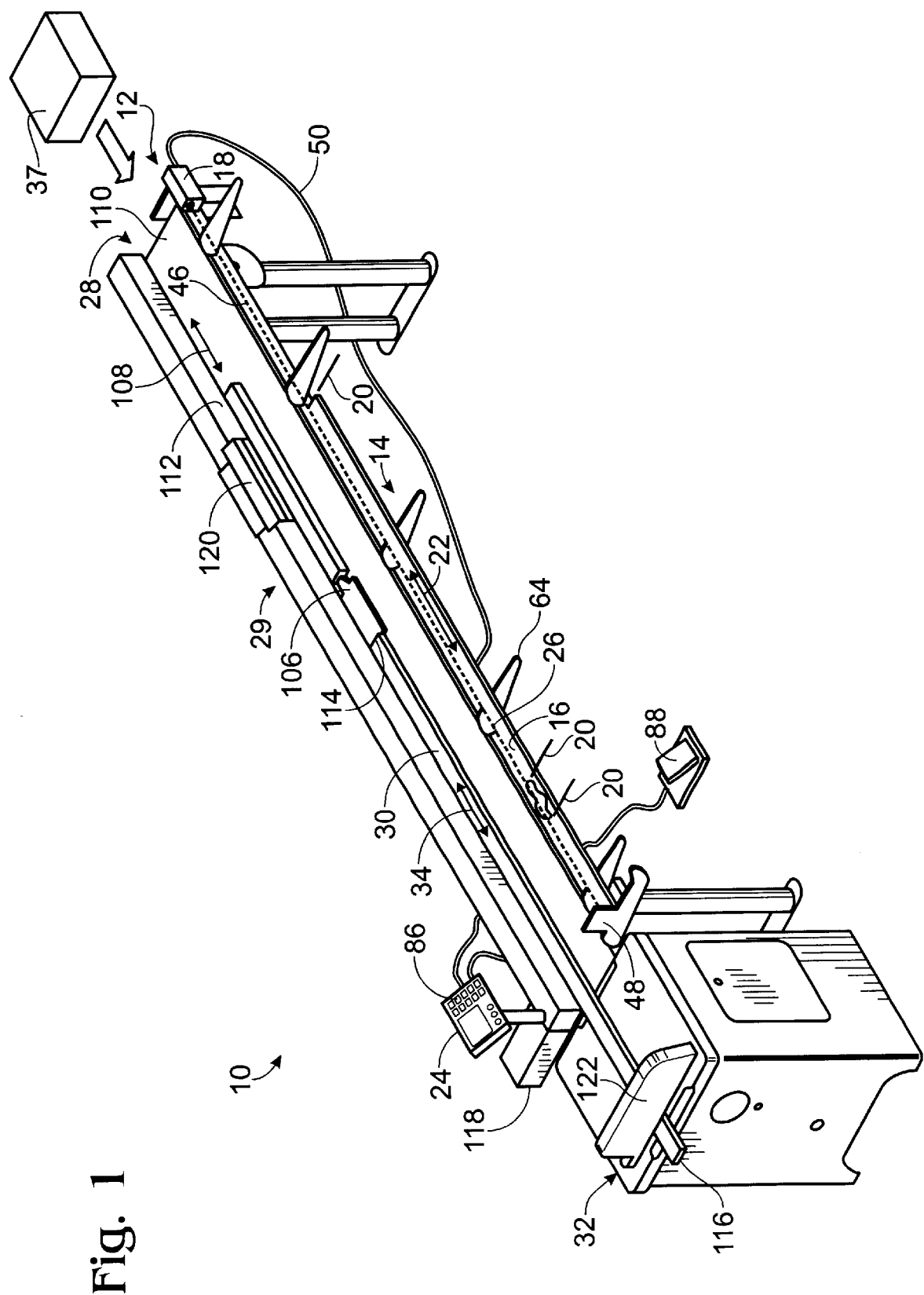
FIG. 1 is an isometric view of an automated processing system including a virtual marking assembly constructed in accordance with the invention.

An automated processing system constructed in accordance with the present invention is shown generally at 10 in FIG. 1. System 10 includes a marking assembly 12 positioned along a front portion. Marking assembly 12 includes a marking station 14 to orient a material 16 relative to an optical measuring device 18. Feature locations 20 along a processing axis 22 of material 16 are supplied by a user directly to the optical measuring device 18, which communicates the feature locations 20 to a processor 24. Marking assembly 12 allows a user to virtually mark feature locations 20 of material 16, typically a wood product, along processing axis 22. A "virtual mark" means a noted location on a material relative to a registration point such as an end of the material or an axis, without an actual mark on the material. Optical measuring device 18 sends light along optical path 26. The light path may be altered by inserting an object into path 26 at a location corresponding to a perimeter region of feature location 20. Processor 24 uses feature locations 20 to determine optical cutting sites. Processing station 28 includes positioner assembly 29, which positions previously-marked material 30, relative to cutting device 32. Positioned material 30 is processed along processing axis 34 of material 30 by device 32 based on virtually-marked feature locations 20 supplied by the user, and a processing list, such as a cut list, both stored in processor 24. A material feeding device 37, such as a roll feeder, may be used to feed material to processing station 28.

Figure 2:
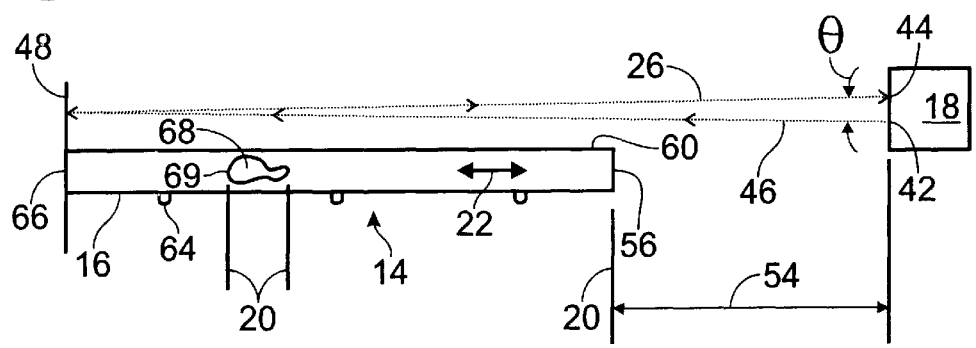
FIG. 2 is a schematic side elevation view of the virtual marking assembly of FIG. 1 showing a default optical path.

As shown schematically in FIG. 2, optical measuring device 18 includes a light source 42 and a light detector 44. Light source 42 sends or transmits light 46, typically produced, for example, by a pulsed laser, along default optical path 26 to reflector 48, which reflects light back to detector 44. The length of optical path 26 measured by device 18 is determined by the point of reflection. Reflector 48 is an optional component of marking station 12 that provides a default optical path when the user has not interrupted optical path 26. Reflector 48 may be useful for calibrating optical measuring device 18 and to assist in positioning and measuring material 16, as described more fully below.

Detector 44 receives light 46 and detects any property of light 46 that allows device 18 to measure the length of optical path 26. Typically, detector 44 allows measurement of a time-of-flight of light 46 along optical path 26 by signaling light detection to a clock. The clock measures the time-of-flight between light transmission and light detection and thus allows a distance measurement or a related light parameter to be sent to processor 24 through any suitable means such as cable 50 of FIG. 1. Rather than a time-of-flight measurement, any other property of light 46 may be measured to determine distance, such as a phase shift using an interferometer. Suitable optical measuring devices 18 for use in the present invention are available from Leica Geosystems of Herrbrugg, Switzerland, under the name DISTO or from Hilti Corporation of Tulsa, Okla. under the names PD10 or PD20.

As shown in FIGS. 1 and 2, processing axis 22 of material 16 is positioned substantially parallel to optical path 26. Light 46 is sent from light source 42, at a distance 54 from distal end 56 of wood product 16. Light 46 travels along optical path 26 in spaced relation from surface 60, typically about 2 inches above surface 60. As shown in FIG. 2, surface 60 of material 16 is substantially parallel to optical path 26 and is either a top surface or a side surface of material 16. Optical path 26 also may be disposed below a bottom surface of material 16 and visualized with an appropriately-positioned mirror or mirrors.

As shown in FIG. 2, reflector 48 may act to define the default optical path 26. Material 16 is oriented substantially parallel to optical path 26 in marking station 14, using an appropriate supporting structure such as brackets 64. A proximal end 66 of material 16 abuts reflector 48. Proximal end 66 is marked by reflector 48, or may be manually marked by altering optical path 26, as described below, without use of reflector 48.

Figure 3:
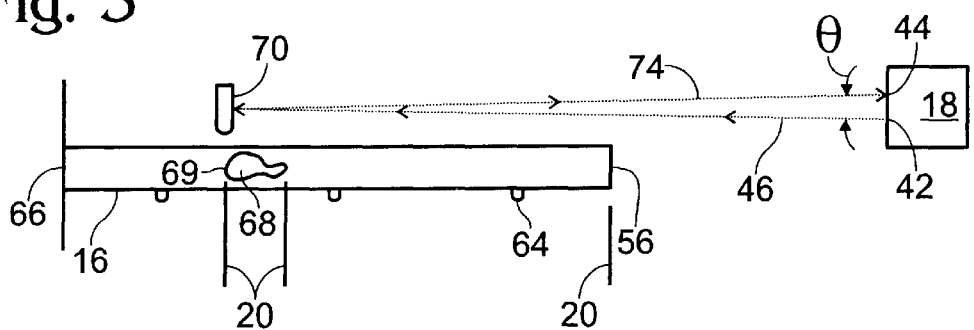
FIG. 3 is a schematic side elevation view of the marking assembly of FIG. 2 with an object marking a proximal boundary of a feature location by creating a new optical path.
Figure 4:
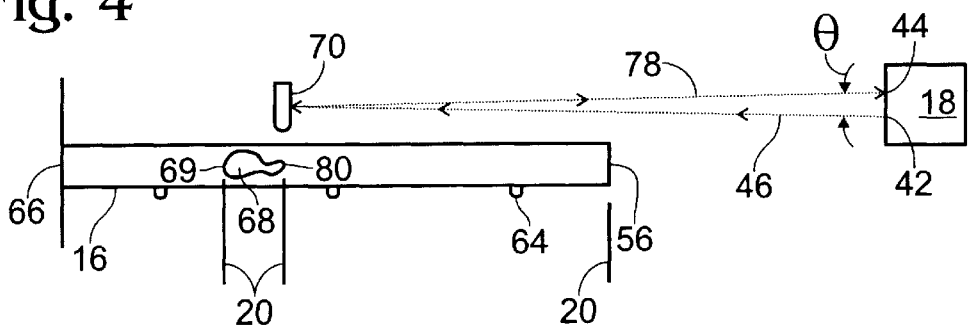
FIG. 4 is a schematic side elevation view of the marking assembly of FIG. 2 with an object marking a distal boundary of a feature location by creating a new optical path.

FIGS. 3–4 show schematically how optical path 26 is altered by an object marking feature locations 20 of feature 68 in material 16. Feature 68 may be any aspect of material 16 between proximal end 66 and distal end 56 that may affect processing of material 16. For example, when material 16 is a wood product, feature 68 may be a defect such as a knot, crack, recess, discolored portion, or uneven surface aberration. Feature 68 may also include one or both of proximal end 66 and distal end 56 of material 16. In some cases feature 68 may include any aspect of material 16 that influences subsequent processing. With wood product 16, feature location 20 typically marks a beginning or boundary location of a clear portion of wood product 16 that is defect-free.

As shown in FIG. 3, proximal end 69 of defect 68 is manually marked by placing a reflective object 70 in optical path 26. Object 70 is any user-controlled object capable of altering default optical path 26 by reflecting light 46 to detector 44 from a position within default optical path 26. Since many surfaces have reflective ability, the choices for object 70 are numerous. Typically, object 70 is provided by an appendage of the user, such as a hand or finger, or by a pen, pointer, paddle, mirror, or similar object. In the example of FIG. 3, object 70 is positioned above the proximal end 69 of defect 68, at the feature location 20 slightly proximal to defect 68. Interrupted, shortened optical path 74 is measured by detector 44 and communicated to processor 24. Similarly, distal end 80 of defect 68 may be marked by positioning object 70, as shown in FIG. 4 at a point along a default optical path 26 corresponding to distal end 80 to produce shortened optical path 74.

The feature location 20 corresponding to distal end 56 of wood product 16 may be marked with object 70, as previously described, or by temporarily lowering optical measuring device 18, or by slightly lifting distal end 56 of material 16 above bracket 64 so that material 16 alters optical path 26. Feature location 20 at distal end 56 may also be communicated directly to processor 24 through keypad 86 by inputting a total overall value for processing dimension 22.

Each optical path 26, 74, 80 includes an angle of reflection θ at which light 46 is reflected back to detector 44. A maximum angle of reflection θ at each feature location is less than about 30°, less than about 20°, or less than about 10°.

A typical session for marking material 16 is initiated with a signal to processor 24 that the user has material 16 properly oriented in marking station 14 on brackets 64. The signal may be initiated by an input either through keypad 86, a switch, such as foot pedal 88, or by altering optical path 26. Processor 24 then recognizes and interprets feature location 20 information sent by optical measuring device 18 according to any suitable logical sequence. For example, the user may use object 70 to mark proximal end 66 and distal end 56 of wood product 16 first, followed by internal feature locations 20 of defect 68. Alternatively, the user may mark all features 20 in order, including one or both end positions of material 16. Processor 24 then interprets internal feature locations 20 as flanking defect 68. Marking station 12 may also include a detectable signal, such as a bell, buzzer, or light, that informs the user when a feature location along processing dimension 22 has been measured and sent to processor 24.

Once all feature locations 20 have been communicated to processor 24, the user typically moves material 16 to processing station 28 where it replaces material 30. Alternatively, a processing station may be located linearly downstream from marking station 14. Another material 16 is then oriented in marking station 14. Processing of material 30 and marking of material 16 may be initiated substantially simultaneously by signaling processor 24, for example with foot switch 88. This signal may activate both positioner assembly 29 and optical marking device 18. Alternatively, marking assembly 12 may be disposed such that material 16 may be marked and subsequently processed without moving material 16 to a distinct processing station 28.

In the system shown in FIG. 1, positioner assembly 29 uses positioner 106 to push material 30 along processing axis 108. Positioner 106 is any structure that determines the position of material 30 along processing axis 108. Examples of positioner 106 include a pusher, a fence, or a stop block or any other similar structure configured to move or index material. Typically, the user places material 30 in processing station 28, on infeed table 110, so that processing axis 34 of material 30 is aligned with processing axis 108 of positioner 106 along guide rail 112. Positioner 106 moves along processing axis 108 to contact distal end 114 of wood product 30. Positioner 106 positions proximal end 116 of wood product 30 an appropriate distance beyond saw 32 based on a positioning signal sent from processor 24 to a motor in housing 118. The motor controls movement of positioner 106 through slider 120 in positioner assembly 29. Slider 120 is displaced along guide rail 112 in response to processor 24 control of the motor. Alternatively, instead of a pushing-type positioner to move material 30 to the saw, the saw may be automatically moved to an appropriate location for cutting according to marked features. In another design, a roll feeder may be used to move material instead of a positioner log.

After positioner 106 has automatically positioned wood product 30 appropriately, saw 32 is activated to process wood product 30. This may be carried out automatically, for example, by processor 24 controlled movement of saw 32 to processing site 122, or manually, by the user moving saw 32 to site 122. In an alternative configuration, movement of material 30 relative to modifying device 32 may be achieved also by moving device 32 along processing axis 34, while material 30 is kept stationary. It is important to note that the marking station 12 may be useful with any microprocessor-controlled automated processing system in which materials to be processed, such as wood product 16, include features 68 that vary in location between the materials along processing axis 22.

Figure 5:
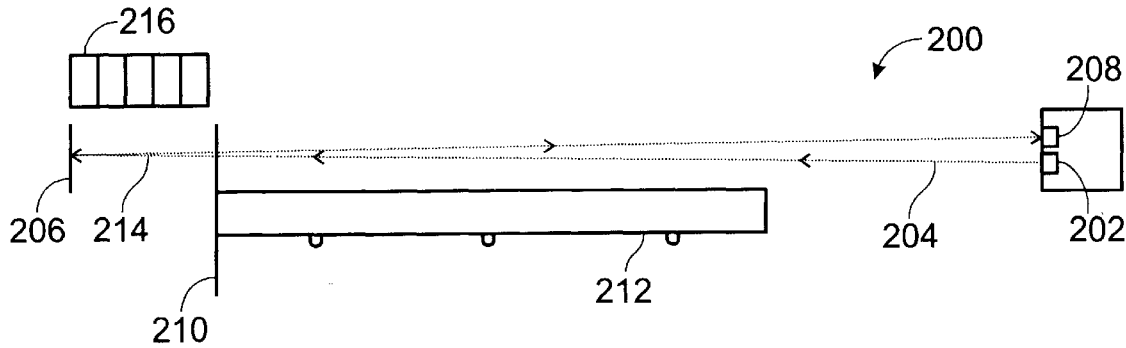
FIG. 5 is a schematic side elevation view of a marking assembly according to an alternative embodiment of the invention.

FIG. 5 shows a marking system 200 according to an alternate embodiment of the invention. Light source 202 directs light beam 204 to reflector 206 where the beam is reflected to detector 208. Bumper 210 maintains material 212, at a fixed location relative to fixed light beam 204. Portion 214 of light beam 204 between bumper 210 and reflector 206 can be used to create signals by interrupting beam portion 214. The signals may be interpreted by the computer, for example, as processing instructions, separate from marking steps on material 212. This design enables many possible functions and adaptations to system 200. For example, a virtual keyboard 216 may be created. A template or similar device may be positioned near beam portion 214 so that operator may point or touch different locations on the template, thereby causing interruptions of beam 204 at different locations. This feature of the invention may be used to signal beginning or ending of a scan, initiation of material handling steps, start and/or stop instructions, the grade of material being processed, processing instructions relative to marks that have been or will be indicated on the material, etc.

Many different processing variations of the invention may be used. For example, the system may be programmed to record marks sequentially in a single direction, so that if a mark is made in or behind an area that was already marked, then the computer deletes all data up to that point allowing for correction and remarking of the area.

The specific embodiments disclosed and illustrated herein should not be considered as limiting the scope of the invention. Numerous variations are possible without falling outside the scope of the appended claims. For example, the invention may be implemented in numerous different machine configurations with varying levels of automation. The invention may also be used to process many different kinds of materials including, but not limited to, wood, wood composites, polymeric materials such as PVC, polystyrene, polypropylene, polyethylene, fiberglass, textiles, etc. In addition to cutting, the invention may be used to carry out other processing steps such as bonding, sewing, heating, UV curing, painting or graphics application, etc. The subject matter of the invention includes all novel and nonobvious combinations and subcombinations of the various elements, features, functions, and/or properties disclosed herein.

We claim:

1. An assembly for virtually marking a feature location of a material, comprising:

an optical measuring device having a light source and a detector, the optical measuring device being configured to measure a length of an optical path from the light source to the detector, the optical path being defined by reflecting light to the detector from adjacent the feature location;

a material feeding device for moving a material generally parallel to an axis of the material to select discrete positions along the axis at which the material is to be processed;

an alignment structure configured to align the material so that the optical path is substantially parallel to the axis of the material; and a digital processor operatively connected to the optical measuring device and configured to locate the feature location based on the length.

2. The assembly of claim 1, wherein the light source is a pulsed laser.

3. The assembly of claim 1, further comprising a saw, the material feeding device being configured to position the material for cutting by the saw based on instructions from the processor.

4. The assembly of claim 1, wherein the material is a wood product.

5. The assembly of claim 1, wherein the processor includes a cut list.

6. The assembly of claim 1, wherein the feature location marks the boundary of a defect.

7. The assembly of claim 1, wherein the feature location corresponds to an end of a wood product.

8. A system for processing a material at a position along an axis of a material based on a feature location virtually marked along the axis, comprising:

a material processing device for physically processing a material;

an optical measuring device having a light source and a detector, the optical measuring device being configured to measure a length of an optical path from the light source to the detector, the optical path being defined by reflecting light to the detector from adjacent the feature location;

a material feeding device for moving the material generally parallel to the axis to select discrete positions along the axis at which the material is to be processed by the material processing device;

an alignment structure configured to align the material so that the optical path is substantially parallel to the axis; and a processor operatively connected to the optical measuring device and configured to send at least one instruction to the material feeding device based on the length of the optical path.

9. The system of claim 8, wherein the material processing device is a saw.

10. The system of claim 8, wherein the material is a wood product.

11. The system of claim 8, wherein the processor includes a cut list.

12. An assembly for inputting processing instructions to a material handling system, comprising:

a material feeding device for moving a material generally parallel to an axis of the material;

an optical measuring device having a light source and a detector, the optical measuring device being configured to measure a length of an optical path from the light source, to an object controlled by an operator of the system, to the detector;

an alignment structure configured to align the material so that the optical path is substantially parallel to the axis of the material;

a digital processor operatively connected to the optical measuring device and configured to send one or more processing instructions to the material handling system based on the length of the optical path; and wherein position of the object determines whether the length marks a feature location or corresponds to a processing instruction that is separate from marking the feature location.

13. The assembly of claim 12, wherein the processing instruction that is separate from marking the feature location relates to at least one of initiating material handling, starting processing, stopping processing, and signaling a grade of material being processed.

14. The assembly of claim 12, further comprising a template, the template defining regions in which the length corresponds to a processing instruction that is separate from marking the feature location, the processing instruction being different for each region.

15. The assembly of claim 12, wherein the optical measuring device and the digital processor are configured to function as a virtual keyboard.

16. The assembly of claim 12, wherein the object is the operator's hand.

17. The assembly of claim 12, wherein the object is an instrument or tool held by the operator.

* * * * *